(12) United States Patent
Hemsing et al.

(10) Patent No.: US 9,915,208 B2
(45) Date of Patent: Mar. 13, 2018

(54) FLAP DEVICE FOR AN INTERNAL COMBUSTION ENGINE

(71) Applicant: PIERBURG GMBH, Neuss (DE)

(72) Inventors: Axel Hemsing, Duesseldorf (DE); Karsten Voigtlaender, Duesseldorf (DE); Uwe Krawinkel, Kaarst (DE)

(73) Assignee: PIERBURG GMBH, Neuss (DE)

( * ) Notice: Subject to any disclaimer, the term of this patent is extended or adjusted under 35 U.S.C. 154(b) by 33 days.

(21) Appl. No.: 14/649,216

(22) PCT Filed: Nov. 5, 2013

(86) PCT No.: PCT/EP2013/073006
§ 371 (c)(1),
(2) Date: Jun. 3, 2015

(87) PCT Pub. No.: WO2014/086537
PCT Pub. Date: Jun. 12, 2014

(65) Prior Publication Data
US 2015/0315984 A1    Nov. 5, 2015

(30) Foreign Application Priority Data

Dec. 7, 2012 (DE) ........................ 10 2012 111 948

(51) Int. Cl.
*F02D 9/04* (2006.01)
*F02D 9/10* (2006.01)
*F16K 1/226* (2006.01)

(52) U.S. Cl.
CPC ............. *F02D 9/04* (2013.01); *F02D 9/1005* (2013.01); *F02D 9/106* (2013.01); *F16K 1/2268* (2013.01)

(58) Field of Classification Search
CPC .......... F02D 9/04; F02D 9/1005; F02D 9/106; F16K 1/2268

(Continued)

(56) References Cited

U.S. PATENT DOCUMENTS 3,693,935 A    9/1972 Thauer
4,231,341 A    11/1980 Kuramoto et al.
(Continued)

FOREIGN PATENT DOCUMENTS

CN    1487183 A    4/2004
CN    1501014 A    6/2004
(Continued)

OTHER PUBLICATIONS

S. Hildebrandt: "Feinmechanische Bauelemente", Hanser Verlag, vol. 3, English Excerpts, pp. 277-280 (1978).

*Primary Examiner* — Joseph Dallo
*Assistant Examiner* — Yi-Kai Wang
(74) *Attorney, Agent, or Firm* — Norman B. Thot

(57) ABSTRACT

A flap device for an internal combustion engine includes a flow housing comprising a flow channel, an actuating shaft, a flap body arranged on the actuating shaft in the flow channel, a bore comprising a shoulder arranged in the flow housing, a bearing bush arranged in the bore, a closure bush, a slide ring comprising a slide ring inner portion, and a sealing element surrounding the actuating shaft. The actuating shaft is mounted in the bearing bush. The sealing element comprises a membrane with a membrane inner portion and a membrane outer portion. The membrane outer portion is clamped axially between the closure bush and the shoulder to form a contact surface on the bore of the flow housing. The membrane inner portion rests against the slide ring inner portion to form a mating surface which is arranged closer to the flow channel than to the contact surface.

10 Claims, 2 Drawing Sheets

(58) Field of Classification Search
USPC .................................................. 123/190.14
See application file for complete search history.

(56) References Cited

U.S. PATENT DOCUMENTS

| | | | |
|---|---|---|---|
| 5,005,545 A | 4/1991 | Wendel et al. | |
| 5,401,001 A | 3/1995 | Cook et al. | |
| 5,630,571 A * | 5/1997 | Kipp | F02D 9/06 251/214 |
| 5,632,245 A * | 5/1997 | Ropertz | B29C 45/14311 123/337 |
| 2003/0005910 A1* | 1/2003 | Komeda | F02D 9/106 123/399 |
| 2004/0040538 A1 | 3/2004 | Shimada | |
| 2004/0182440 A1 | 9/2004 | Watts et al. | |
| 2005/0183705 A1 | 8/2005 | Nanba et al. | |
| 2008/0000458 A1* | 1/2008 | Isogai | F02D 9/101 123/527 |
| 2008/0223450 A1* | 9/2008 | Kino | F02D 9/106 137/331 |
| 2011/0278486 A1 | 11/2011 | Brozio | |
| 2013/0001882 A1 | 1/2013 | Voigtlaender et al. | |

FOREIGN PATENT DOCUMENTS

| | | | |
|---|---|---|---|
| CN | 1505731 A | | 6/2004 |
| CN | 1523213 A | | 8/2004 |
| CN | 1657759 A | | 8/2005 |
| CN | 101096934 A | | 1/2008 |
| CN | 101413443 A | | 4/2009 |
| CN | 102278210 A | | 12/2011 |
| DE | 1 123 876 B | | 2/1962 |
| DE | 39 05 655 A1 | | 8/1990 |
| DE | 43 13 454 A1 | | 10/1994 |
| DE | 693 01 463 T2 | | 8/1996 |
| DE | 297 16 937 U1 | | 10/1997 |
| DE | 203 02 520 U1 | | 6/2004 |
| DE | 20 2008 005 992 U1 | | 8/2008 |
| EP | 2 113 692 B1 | | 12/2011 |
| GB | 889952 A | | 2/1962 |
| GB | 000889952 A | * | 2/1962 |
| GB | 2 277 368 A | | 10/1994 |
| JP | 4-30238 U | | 3/1992 |
| JP | 7-259586 A | | 10/1995 |
| JP | 07259586 A | * | 10/1995 |
| JP | 10-169472 A | | 6/1998 |
| JP | 2005-042845 A | | 2/2005 |
| JP | 2012-41886 A | | 3/2012 |
| WO | WO 2011/091909 A1 | | 8/2011 |

* cited by examiner

FLAP DEVICE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2013/073006, filed on Nov. 5, 2013 and which claims benefit to German Patent Application No. 10 2012 111 948.1, filed on Dec. 7, 2012. The International Application was published in German on Jun. 12, 2014 as WO 2014/086537 A1 under PCT Article 21(2).

FIELD

The present invention relates to a flap device for an internal combustion engine with a flow housing, in which a flow channel is formed, an actuating shaft, a flap body that is arranged on the actuating shaft in the flow channel, a bore in the flow housing, through which the actuating shaft protrudes to the exterior, a first bearing bush, which is arranged in the bore and in which the actuating shaft is mounted, and a sealing that surrounds the actuating shaft radially and which has an annular metal membrane.

BACKGROUND

Such flap devices serve, for example, as exhaust gas accumulation flaps or as exhaust gas recirculation flaps in the exhaust gas system of an internal combustion engine. Exhaust gas contains pollutants that must not escape to the outside, so that a reliable sealing must be provided along the shaft that protrudes outward to an actuator. This sealing must function perfectly at all times under varying thermal loads. A precise controllability must also be achieved with the flaps in order to meet the emission regulations for modern internal combustion engines.

Various flap devices have previously been described which attempt to satisfy these objectives. DE 20 2008 005 992 U1 describes a flap valve which is supported on two sides and which is intended for use in the hot area of exhaust systems. A seal is arranged on an inclined shoulder of the shaft being pressed by a spring force against an opposite sealing surface of the housing. The sealing point also serves to axially secure the flap shaft. The centering of the flaps in the channel and an occurring thermal expansion may lead to a jamming of the flap in the channel when the flap is closed.

An exhaust flap is also described in JP 07259586, wherein a thin metal ring fixed with screws is arranged behind the bearing bush, the outer circumference of the ring resting on the laterally delimiting wall of the surrounding housing. The metal ring is displaced along the surrounding side wall when a thermal expansion occurs. Due to the small contact surface or to scores formed in the housing over time, no sufficient tightness can be provided over the long term. Increased wear is also caused by the turning of the metal ring.

The prior art designs are disadvantageous because they fail to provide sufficient sealing if thermal conditions change and also fail to provide an adjustability of the flap without a risk of jamming.

SUMMARY

An aspect of the present invention is to provide a flap mechanism for an internal combustion engine which provides a secure sealing regardless of the thermal load and the thermal expansion resulting therefrom, and which provides for a smooth movement of the flap body. A further aspect of the present invention is to reduce wear and to provide a long useful life compared to known designs.

In an embodiment, the present invention provides a flap device for an internal combustion engine which includes a flow housing comprising a flow channel, an actuating shaft, a flap body arranged on the actuating shaft in the flow channel, a bore comprising a shoulder, a first bearing bush arranged in the bore, a closure bush, a sliding ring comprising a sliding ring radially inner portion, and a sealing element configured to radially surround the actuating shaft. The bore is arranged in the flow housing and is configured to have the actuating shaft protrude therethrough to an exterior of the bore. The first bearing bush is configured to have the actuating shaft be mounted therein. The sealing element comprises an annular metal membrane which comprises an annular metal membrane radially inner portion and an annular metal membrane radially outer portion. The annular metal membrane radially outer portion is clamped axially between the closure bush and the shoulder of the bore so as to form a contact surface on the bore of the flow housing. The annular metal membrane radially inner portion rests against the sliding ring radially inner portion so as to form a mating surface. The mating surface is arranged closer to the flow channel than to the contact surface.

BRIEF DESCRIPTION OF THE DRAWINGS

The present invention is described in greater detail below on the basis of embodiments and of the drawings in which.

DETAILED DESCRIPTION

Figure 1:
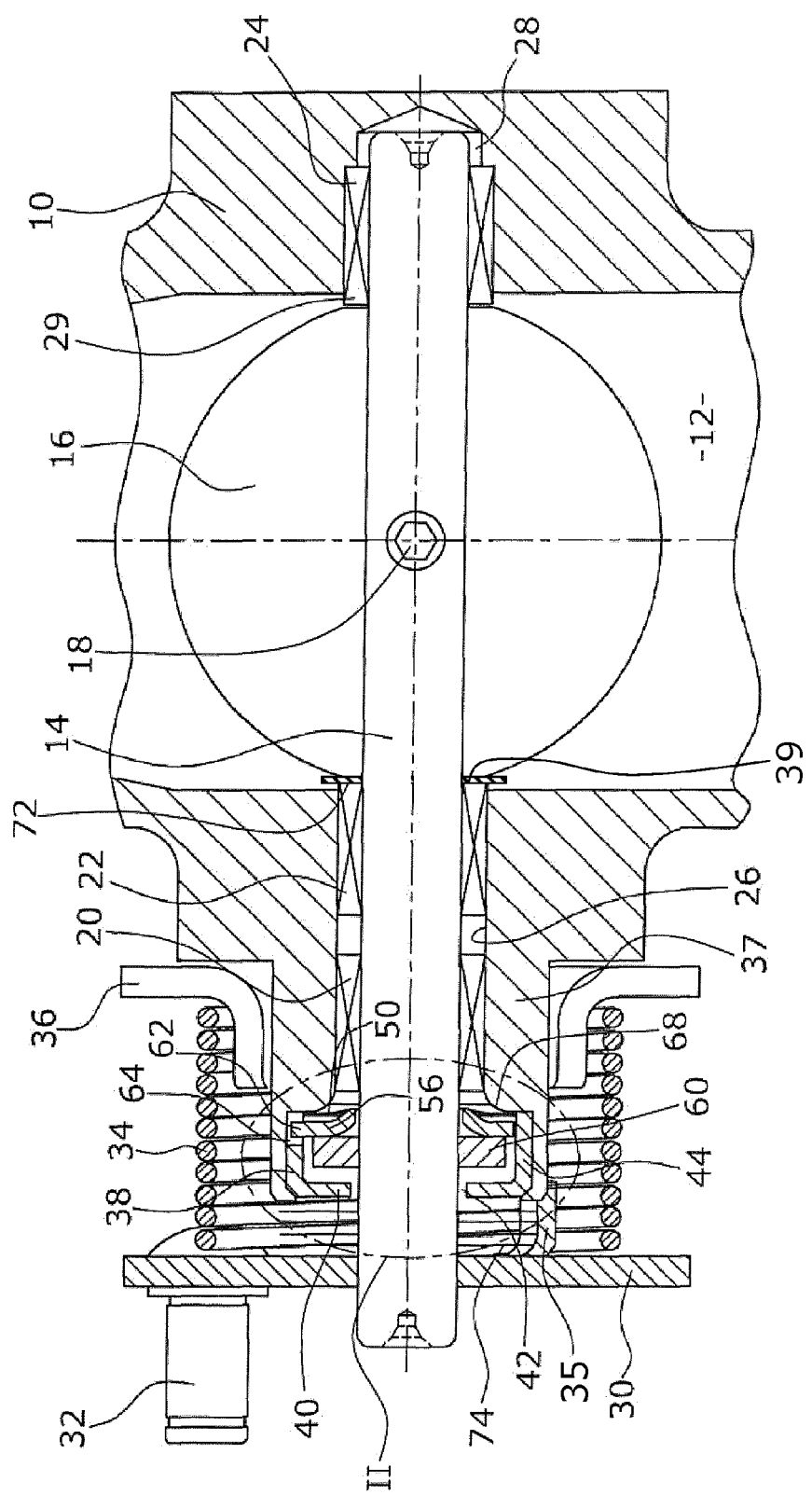
FIG. 1 shows a side elevational view of a flap device of the present invention in section.
Figure 2:
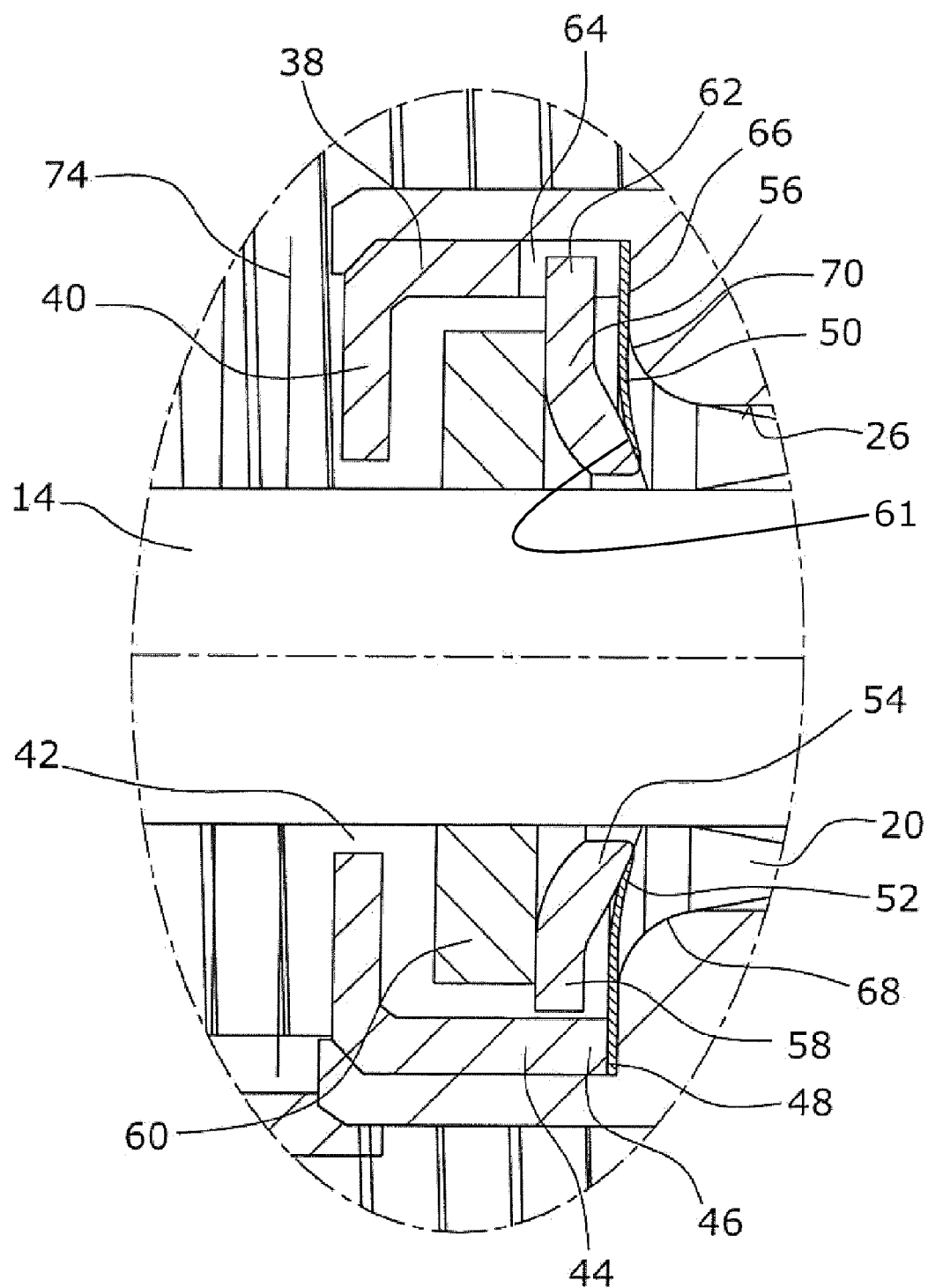
FIG. 2 shows an enlarged detail of the shaft sealing of the flap device of the present invention shown in FIG. 1.

Because a radially outer portion of the metal membrane is clamped axially between a closure bush and a shoulder forming a contact surface on the bore of the flow housing, and a radially inner portion rests against a radially inner portion of a sliding ring, whose mating surface with the metal membrane is arranged more closely to the flow channel than the contact surface, the metal membrane achieves a sealing at the outer portion and achieves a sealing at the radially inner portion of the metal membrane, wherein an axial displacement of the actuating shaft does not compromise this sealing effect. The axial position of the shaft is not defined by non-flexible sealing means that are fixedly positioned with respect to the shaft so that a slight displacement due to the turning of the flap or to thermal expansion cannot lead to a jamming of the flap.

In an embodiment of the present invention, the sealing can, for example, comprise a shaft sleeve mounted on the actuating shaft, the sliding ring resting against the sleeve by its side axially opposite the metal membrane. This prevents a flow of exhaust gas along the actuating shaft and defines the relative position of the sliding ring to the shaft.

In an embodiment of the present invention, the sliding ring can, for example, be spherically curved in the radially inner portion. A plane contact of the metal membrane on the sliding ring is thereby achieved at any temperature. A good sealing effect is obtained due to the plane contact. This sealing effect is maintained even when the shaft is tilted within the tolerances of the bearing.

In an embodiment of the present invention, the closure bush can, for example, be pot-shaped, wherein the bottom of the closure bush has an opening through which the actuating shaft protrudes, and the axial end of the side walls rests on the metal membrane. The closure bush thereby closes the bore at least partly and provides the fastening of the metal membrane. The closure bush may either be pressed in or be fastened in the housing by bending the surrounding housing.

In an embodiment of the present invention, the contact surface can, for example, be shaped spherically in a portion that is formed radially inside the side walls of the closure bush. A kinking and thus a merely linear contact are thereby avoided on the side of the metal membrane opposite the sliding ring. A plane contact with good sealing properties is instead obtained even with the spring load still acting on the metal membrane.

In an embodiment of the present invention, the side walls of the closure bush can, for example, be provided with a recess into which a protrusion of the sliding ring projects, which protrusion extends radially outward. The shaft sleeve is thereby prevented from taking the sliding ring along during the turning movement of the actuator shaft so that a relative movement between the sliding ring and the closure bush, as well as between the sliding ring and the metal membrane, is prevented. Wear is thereby significantly reduced.

In an embodiment of the present invention, a second bearing bush can, for example, be arranged in the bore, the axial end of the bush protruding into the flow channel. The force of a compression spring can advantageously urge the flap body against the second bearing bush or against a thrust washer adjacent the second bearing bush. This bearing bush, together with the flap body, serves to axially secure the actuating shaft so that this axial securing is no longer effected through the sealing means. Internal leakage can thereby be reduced since the outer contour of the flap body can be adapted more accurately to the channel. In order to additionally reduce wear with such an axial securing of the actuating shaft through the flap body, the flap body rests on a thrust washer adjacent the second bearing bush.

In an embodiment of the present invention, a blind hole can, for example, be formed in the side of the flow housing opposite the bore, the hole being provided with a third bearing bush in which the actuating shaft is supported. The actuating shaft is thereby supported on both sides in the flow housing so that no damage to the bearing bush is expected even at a high exhaust gas pressures.

It is advantageous if the axial end of the third bearing bush protrudes into the flow channel. By means of a protrusion on the flap body surrounding the bearing bush, the ingress of dirt into the third bearing bush can largely be prevented, whereby the useful life of the flap body is extended.

A flap device for an internal combustion engine is thus provided which is sufficiently tight to the outside even under varying thermal loads and which shows only negligible internal leakage since component and assembly tolerances, as well as the thermal expansion, are compensated for by the axially flexible metal membrane. The ingress of dirt from the outside is also avoided. Wear at the flap device is clearly reduced so that a long useful life is achieved.

An embodiment of a flap device of the present invention is illustrated in the drawings and will hereinafter be described.

The flap device of the present invention is formed by a flow housing 10 in which a flow channel 12 is provided through which exhaust gas may, for example, flow.

Seen in cross section, the flow channel 12 is divided in two halves by an actuating shaft 14 on which a flap body 16 is fastened by means of a screw 18. In the flow housing 10, the actuating shaft 14 is supported by three bearing bushes 20, 22, 24, of which the first bearing bush 20 and the second bearing bush 22 are arranged in a through bore 26 through which the actuating shaft 14 protrudes outward from the flow housing 10, and the third bearing bush 24 is arranged in a blind hole 28 formed in the flow housing 10 on the side opposite the through bore 26, an axial end 29 of the third bearing bush 24 extending into the flow channel 12. A two-sided support of the actuating shaft 14 is correspondingly obtained on sides that are opposite each other with respect to the center axis of the flow housing 10.

A disc 30 serving as a lever is mounted on the outward protruding end of the actuating shaft 14, a pin 32 being fastened to the radial end portion of the disc 30, the pin 32 being adapted to connect the actuating shaft 14 to an actuator through a lever linkage (not illustrated herein), which actuator may in particular be designed as an electric motor.

A return spring 34 is provided on the side of the disc 30 opposite the pin 32 which has one end resting on a pin 35 formed on the disc 30, while the opposite end rests on a stop (not illustrated herein) formed on a housing 36 of the actuator which surrounds a bearing and sealing section 37 of the flow housing 10 extending from the flow housing 10 towards the disc 30, and which serves as a guide and an axial support for the return spring 34. Depending on the application, in a manner known per se, a pre-tensioning during the assembly causes a defined fail-safe position of the actuating shaft 14 to be moved to in the event of an actuator failure.

The through bore 26 that extends through the bearing and sealing section 37 of the flow housing 10 is closed with a pot-shaped closure bush 38 which has an opening 42 formed in its bottom 40, through which the actuating shaft 14 protrudes. Side walls 44 of the pot-shaped closure bush 38, which extend from the bottom, radially contact inner walls of the through bore 26 and their end 46 axially rests on a radially outer portion 48 of an annular metal membrane 50, while a curved radially inner, spherically inner portion 54 of a sliding ring 56 rests on the radially inner portion 52 of the annular metal membrane 50.

On the axially opposite side, a planar radially outer portion 58 of the sliding ring 56 fixedly rests on a shaft sleeve 60 which is pressed onto the actuating shaft 14 and which is also arranged inside the pot-shaped closure bush 38. On one side, the sliding ring 56 has a radially extending protrusion 62 that extends into a recess 64 formed in the axial end 46 of the side wall 44 of the pot-shaped closure bush 38 so that the sliding ring 56 is prevented from turning. This means that when the actuating shaft 14 turns, only a relative movement between the sliding ring 56 and the shaft sleeve 60 occurs, while the sliding ring 56 is stationary with respect to the annular metal membrane 50, whereby wear is minimized and the sealing effect of the assembly is maintained.

As explained above, the axial end 46 of the side walls 44 of the pot-shaped closure bush 38 rests on the annular metal membrane 50 from the first axial side in the radially outer portion 48. In this manner, the radially outer portion 48 of the annular metal membrane 50 is pressed against an axial contact surface 66 by the pot-shaped closure bush 38, which axial contact surface 66 is formed by a shoulder 68 in the through bore 26 so that this sealing assembly is arranged in a larger diameter portion of the through bore 26.

In its radially outer portion 48, the axial contact surface 66 is arranged perpendicular to the actuating shaft axis and has a portion 70 that adjoins the radially outer portion 48 and extends radially inward, the portion 70 being spherically shaped so that, in this portion 70, the shoulder 68 is formed by a continuous transition.

According to the present invention, the sealing formed by the annular metal membrane 50, the sliding ring 56 and the shaft sleeve 60, are arranged in the through bore 26 so that, as compared to the fixed radially outer portion 48, the radially inner portion 52 is curved towards the flow channel 12. This is achieved by positioning the shaft sleeve 60 on the actuating shaft 14 so that the spherically inner portion 54 of the sliding ring 56, and thus also a mating surface 61 between the spherically inner portion 54 of the sliding ring 56 and the radially inner portion 52 of the annular metal membrane 50, protrudes axially towards the flow channel 12 beyond the axial contact surface 66. A spring force is generated at the annular metal membrane 50.

Exhaust gas leaving the flow channel 12 and passes the first bearing bush 20 and the second bearing bush 22 along the actuating shaft 14, either passes through the opening of the sliding ring 56, where it is stopped by the shaft sleeve 60 itself or by the sealing surface between the shaft sleeve 60 and the sliding ring 56, or it flows along the annular metal membrane 50, where the exhaust gas is kept from flowing farther, either in the radially inner portion 52, by the mating surface 61, acting as a sealing surface, between the tensioned annular metal membrane 50 and the spherically inner portion 54 of the sliding ring 56, or, in the radially outer portion 48, by the annular metal membrane 50 resting on the axial contact surface 66. The spherical shape of the sliding ring 56 and of the portion 70 of the axial contact surface 66 here prevent a kinking of the annular metal membrane 50. A sealing surface as wide as possible is instead always formed both between the sliding ring 56 and the annular metal membrane 50 and between the annular metal membrane 50 and the axial contact surface 66 because the annular metal membrane 50 can rest on the opposite component in a plane manner, without resting on an edge which would only provide a linear contact.

This means that, due to the flexible annular metal membrane 50, the actuating shaft 14 is axially movable to a certain degree. The sealing assembly thus does not serve to axially fix the actuating shaft 14 and, thereby, fix the flap body 16 in the flow channel 12.

This axial securing is achieved by the axial end 72 of the second bearing bush 22 protruding slightly into the flow channel 12 and by providing a compression spring 74 between the pot-shaped closure bush 38 and the disc 30, by which compression spring 74 the actuating shaft 14 and, thereby, the flap body 16 are urged towards the axial end 72 of the second bearing bush 22. The axial securing of the actuating shaft 14 is correspondingly provided by the interaction of the flap body 16 and the axial end 72 of the second bearing bush 22.

If, in operation, component and assembly tolerances occur that were not taken into account, or if, for example, thermal expansion due to varying thermal loads occurs, or if wear is caused by use, a sufficient sealing is provided since axial warping is compensated for by the flexibility of the metal membrane acting as the sealing element. Even a centering of the flap body in the position closing the channel does not result in a separation of the sealing parts due to this axial compensation provided by the pre-tensioned metal membrane. By this separation of the axial securing of the shaft and the sealing, the flap is prevented from jamming in the event of warping. The ingress of dirt from outside is excluded by the sealing already being arranged before the first bearing bush 20, as seen from the outside. The flap device and its sealing have a long useful life because of low wear.

It should be obvious that the scope of protection is not limited to the flap device described herein, but that various modifications are conceivable. For example, thrust washers may be used between stationary and turning components. A thrust washer 39 can, for example, be arranged to adjoin the second bearing bush 22. The flap body 16 is thereby tensioned against the thrust washer 39 by a force of the compression spring 74. Reference should also be had to the appended claims.

What is claimed is:

1. A flap device for an internal combustion engine, the flap device comprising:
   a flow housing comprising a flow channel;
   an actuating shaft;
   a flap body arranged on the actuating shaft in the flow channel;
   a bore comprising a shoulder, the bore being arranged in the flow housing and being configured to have the actuating shaft protrude therethrough to an exterior of the bore;
   a first bearing bush arranged in the bore, the first bearing bush being configured to have the actuating shaft be mounted therein;
   a closure bush;
   a sliding ring comprising a sliding ring radially inner portion; and
   a sealing element configured to radially surround the actuating shaft, the sealing element comprising an annular metal membrane which comprises an annular metal membrane radially inner portion and an annular metal membrane radially outer portion,
   wherein,
   the annular metal membrane radially outer portion is clamped axially between the closure bush and the shoulder of the bore so as to form a contact surface on the bore of the flow housing,
   the annular metal membrane radially inner portion rests against the sliding ring radially inner portion so as to form a mating surface, the mating surface being arranged closer to the flow channel than to the contact surface, and
   the sliding ring is spherically curved in the sliding ring radially inner portion.

2. The flap device as recited in claim 1, wherein,
   the sealing element further comprises a shaft sleeve mounted on the actuating shaft, and
   a side of the sliding ring axially opposite of the annular metal membrane is configured to rest on the shaft sleeve.

3. The flap device as recited in claim 1, wherein the closure bush is configured to be pot-shaped and comprises side walls comprising an axial end and a bottom which comprises an opening configured to have the actuating shaft protrude therethrough, the axial end of the side walls being configured to rest on the annular metal membrane.

4. The flap device as recited in claim 3, wherein the contact surface is configured to be spherically shaped in a region formed inside the side walls of the closure bush.

5. The flap device as recited in claim 3, wherein,
   the sliding ring further comprises a protrusion configured to extend radially outward, and
   the side walls of the closure bush comprise a recess into which the protrusion of the sliding ring extends.

6. The flap device as recited in claim 1, further comprising:
- a second bearing bush arranged in the bore, the second bearing bush comprising an axial end which protrudes into the flow channel.

7. The flap device as recited in claim 6, further comprising:
- a compression spring,
- wherein, the flap body is tensioned against the second bearing bush by a force of the compression spring.

8. The flap device as recited in claim 6, further comprising:
- a thrust washer arranged between the second bearing bush and the flap body; and
- a compression spring,
- wherein, the flap body is tensioned against the thrust washer by a force of the compression spring.

9. The flap device as recited in claim 6, further comprising:
- a third bearing bush configured to support the actuating shaft,
- wherein,
- the flow housing comprises a blind hole on a side of the flow housing opposite the bore, the third bearing bush being arranged in the blind hole.

10. The flap device as recited in claim 9, wherein the third bearing bush comprises an axial end which is configured to protrude into the flow channel.

\* \* \* \* \*